(12) United States Patent
Yamada

(10) Patent No.: US 8,213,270 B2
(45) Date of Patent: Jul. 3, 2012

(54) OPTICAL DISK RECORDING APPARATUS AND PROGRAM

(75) Inventor: Seiya Yamada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1001 days.

(21) Appl. No.: 11/072,380

(22) Filed: Mar. 4, 2005

(65) Prior Publication Data

US 2005/0213450 A1    Sep. 29, 2005

(30) Foreign Application Priority Data

Mar. 5, 2004  (JP) ................................. 2004-062764

(51) Int. Cl.
*G11B 7/125*  (2012.01)

(52) U.S. Cl. ................. 369/13.27; 369/13.26; 369/47.5; 369/44.27; 369/53.27

(58) Field of Classification Search ............... 369/44.27, 369/47.49, 47.5, 47.53, 53.26, 53.27, 13.26, 369/13.27
See application file for complete search history.

(56) References Cited

U.S. PATENT DOCUMENTS

| | | | | |
|---|---|---|---|---|
| 5,436,880 | A * | 7/1995 | Eastman et al. | 369/47.51 |
| 2001/0043527 | A1 * | 11/2001 | Yoshida | 369/47.51 |
| 2002/0015368 | A1 * | 2/2002 | Toda et al. | 369/47.51 |
| 2003/0031105 | A1 | 2/2003 | Maekawa | |
| 2005/0025018 | A1 * | 2/2005 | Hsu et al. | 369/53.26 |
| 2005/0163019 | A1 * | 7/2005 | Kim et al. | 369/116 |

FOREIGN PATENT DOCUMENTS

| | | | |
|---|---|---|---|
| JP | 07-272305 | | 10/1995 |
| JP | 2002-352433 | | 12/2002 |
| JP | 2003218459 | A * | 7/2003 |
| JP | 2004-022131 | | 1/2004 |

OTHER PUBLICATIONS

Electronic translation of JP 2003-218459.*
Japanese Patent Office: Notice of Reasons for Rejection for Japanese Patent Application No. 2004-062764, Dated Feb. 12, 2008 (5 pgs.).

* cited by examiner

*Primary Examiner* — Wayne Young
*Assistant Examiner* — Dionne Pendleton
(74) *Attorney, Agent, or Firm* — Pillsbury Winthrop Shaw Pittman LLP

(57) ABSTRACT

In an optical disk recording apparatus, a monitor monitors a recording power of a laser light. A laser control circuit enables a laser diode to perform test recording while using the monitor to monitor the recording power of the laser light and while controlling a laser drive voltage, so that the monitored recording power reaches a given reference value during the test recording. A voltage measurement section measures the laser drive voltage when the recording power of the laser light reaches the reference value. A calculation section calculates an initial laser drive voltage from the reference value of the recording power and the measured laser drive voltage corresponding to the reference value. A main controller allows the laser control circuit to set the calculated initial laser drive voltage and to start the recording while supplying the laser control circuit with the target value so that an actual recording power of the laser light promptly reaches the target value during the course of the recording.

8 Claims, 7 Drawing Sheets

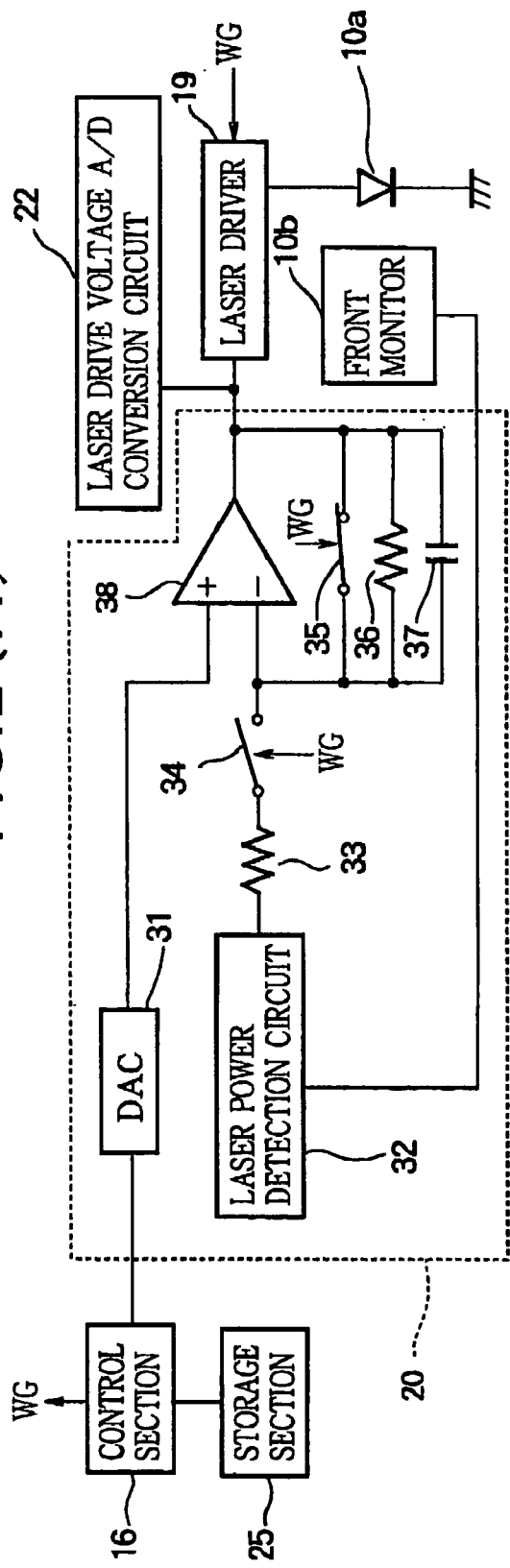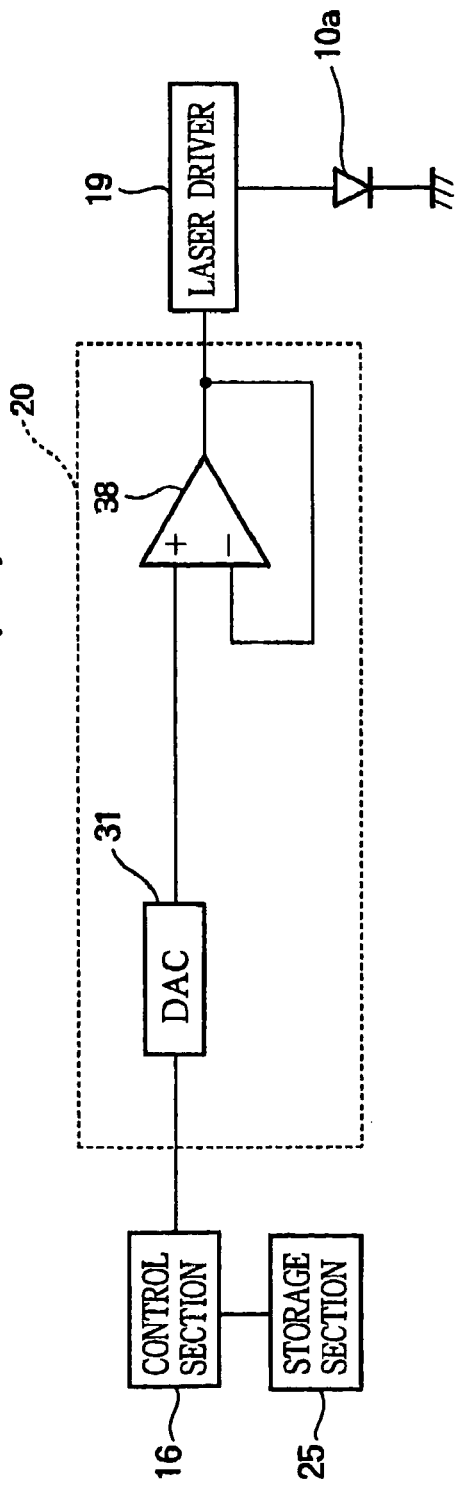

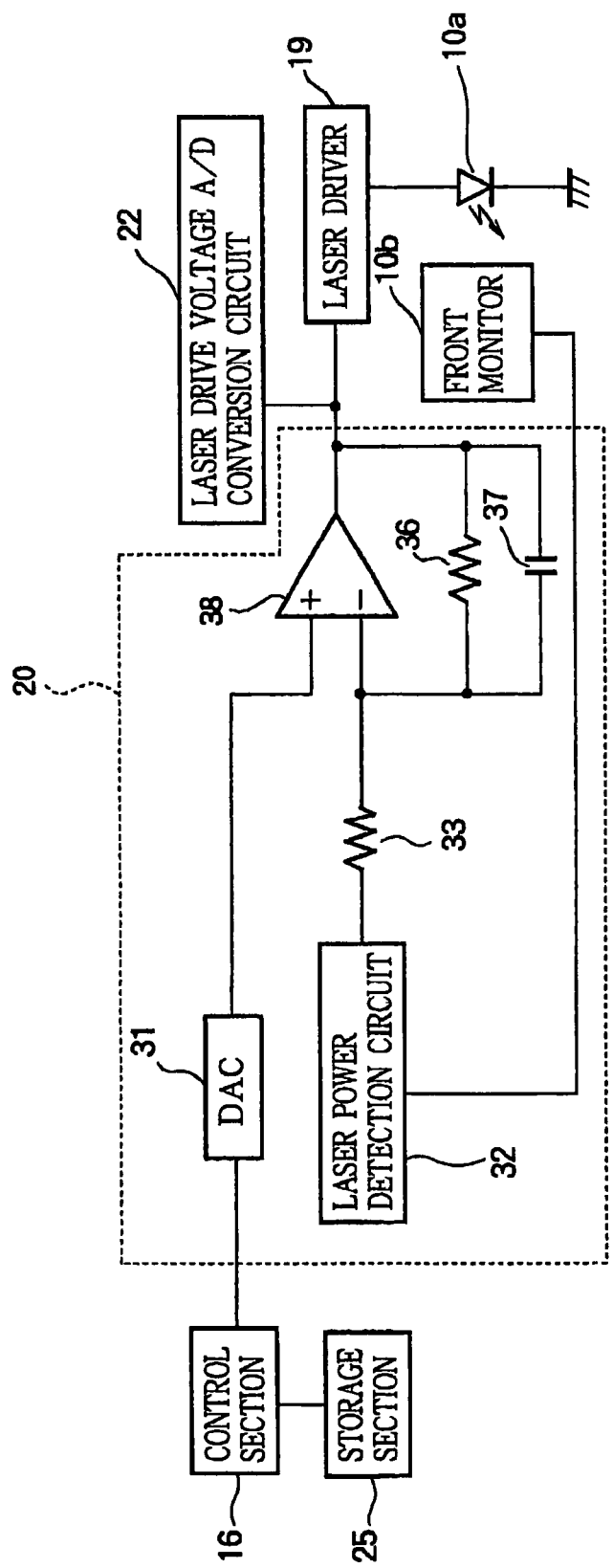

OPTICAL DISK RECORDING APPARATUS AND PROGRAM

BACKGROUND OF THE INVENTION

1. Technical Field

The present invention relates to an optical disk recording apparatus and an initial laser drive voltage calculation program capable of fast and accurately finding an initial laser drive voltage with reference to a target recording power at the time to start recording.

2. Related Art

A conventional optical disk recording apparatus finds a relational expression between a laser recording power and a laser drive voltage. Based on the relational expression, the apparatus determines the laser drive voltage to radiate the laser light set to the target recording power. The purpose is to shorten the time in which the laser recording power reaches a target recording power at the beginning of data recording. For example, the optical disk recording apparatus turns on a laser diode using two or more different preset recording powers. The optical disk recording apparatus detects a laser drive voltage at that time to find a relational expression between the recording power and the laser drive voltage. When the data recording starts, the optical disk recording apparatus configures a drive voltage based on the relational expression to set the laser recording power to a target value.

An optical disk recording apparatus has the laser diode control circuit (e.g., see patent document 1). This circuit stores a controls result of setting the recording power. After the next startup, the circuit reads the control result data for the previous recording power to configure the recording power. Such an optical disk recording apparatus is disclosed for example in Patent Publication No. 07-272305 (pp. 4 to 8, FIGS. 1 to 8).

However, the conventional optical disk recording apparatus turns on the laser to detect a laser drive voltage by forcibly turning off the focus servo to prevent recording on optical disks. Accordingly, the optical disk recording apparatus needs to reactivate the focus servo to start OPC (Optical Power Control). Extra time is needed before starting the OPC, thereby being incapable of fast starting the data recording.

The focus servo needs to be forcibly turned on or off, complicating programming for the optical disk recording apparatus.

As mentioned above, the optical disk recording apparatus turns off the focus servo to find the relational expression between the recording power and the laser drive voltage. The following problem exists. When a specified recording power is obtained from the relational expression, a laser drive voltage for the recording power differs from an actually recorded value.

FIG. 7 is a graph showing relationship between a laser diode drive voltage and recording power. When the optical disk recording apparatus radiates laser light to an optical disk by turning on the focus servo, reflected light partially also returns to the laser diode from the optical disk. Affected by this, the laser diode changes the luminous efficiency. When the optical disk recording apparatus radiates laser light to an optical disk while turning off the focus servo, almost no reflected light returns to the laser diode from the optical disk. The laser diode is free from the effect of the reflected light. For example, FIG. 7 shows a first case turning on the focus servo to allow return light and a second case turning off the focus servo to remove return light. Consequently, recording power Pw is subject to difference ΔP between the first and second cases, thereby causing the problem of making the recording power different from an actual value as mentioned above.

SUMMARY OF THE INVENTION

It is therefore an object of the present invention to provide an initial laser drive voltage calculation method and an initial laser drive voltage calculation program capable of fast and accurately finding an initial laser drive voltage corresponding to a target recording power when an optical disk recording apparatus starts recording.

To solve the above-mentioned problems and to achieve the object of the invention, the present invention has the following constructions.

An inventive optical disk recording apparatus has an optical pickup containing a laser device driven by a laser drive voltage for radiating a laser light having a recording power for performing recording of information onto an optical disk. The inventive apparatus comprises a monitor section that monitors the recording power of the laser light, a laser control section that enables the laser device to perform test recording while using the monitor section to monitor the recording power of the laser light and while controlling the laser drive voltage, so that the monitored recording power reaches a given reference value during the test recording, a voltage measurement section that measures the laser drive voltage when the recording power of the laser light reaches the reference value, a calculation section that calculates an initial laser drive voltage from the reference value of the recording power and the measured laser drive voltage corresponding to the reference value, the initial laser drive voltage corresponding to a target value of the recording power specified for use in recording of information on the optical disk, and a main control section that allows the laser control section to set the calculated initial laser drive voltage and to start the recording while supplying the laser control section with the target value so that an actual recording power of the laser light promptly reaches the target value during the course of the recording.

In this construction, the test recording is performed on an optical disk to previously find the relationship between the recording power and the laser drive voltage. Based on this relationship, an initial laser drive voltage corresponding to a recording target value is calculated to perform actual recording with using the target recording power. A conventional method finds an initial laser drive voltage without performing the recording on an optical disk by turning off the focus of the pickup. In the conventional disk recording apparatus uses a recording power that differs from the actual recording power. Thus, the actual recording on optical disks requires readjustment of the recording power's target value. By contrast, the present invention can solve this problem. That is, the inventive recording apparatus determines the relational expression between the laser drive voltage and the laser power with using the same condition as that for use in the actual data recording. Thus obtained relational expression based on the data recording is used to calculate an initial laser drive voltage corresponding to a target value of the laser recording power. The target recording power can be secured for recording immediately after the recording starts. As mentioned above, data can be recorded on optical disks without turning off the focus servo to measure the laser drive voltage. It is possible to fast calculate the initial laser drive voltage and quickly start the recording without requiring time for focus adjustment.

Preferably, the inventive optical disk recording apparatus further comprises a storage section that stores at least two reference values of the recording power, wherein the voltage measurement section measures laser drive voltages matching the respective reference values stored in the storage section, and the calculation section formulates a relational expression between the laser drive voltage and the recording power of the laser light based on the respective reference values and the measured laser drive voltages corresponding to the respective reference values and uses this relational expression to calculate the initial laser drive voltage corresponding to the target value of the recording power. Further, the calculation section substitutes the target value of the recording power for the relational expression to calculate the initial laser drive voltage.

In this construction, the optical disk recording apparatus measures laser drive voltages in correspondence to at least two target values of the recording power stored in the storage section, and calculates the relational expression between the recording power target value and the laser drive voltage. Accordingly, setting the calculated laser drive voltage to the laser control section can promptly start recording on an optical disk using the laser light having an intended target laser power.

Preferably, the calculation section calculates the initial laser drive voltage for use in optical power control (OPC) operation.

In this construction, the optical disk recording apparatus performs OPC test writing on an optical disk by radiating laser light to an optical disk from the laser diode using the recording power having the predetermined target value. It is possible to calculate the initial laser drive voltage corresponding to the target laser power value in a short time period to promptly start OPC recording.

An inventive computer program is used in an optical disk recording apparatus having an optical pickup containing a laser device driven by a laser drive voltage for radiating a laser light having a recording power onto an optical pickup, and a monitor device for monitoring the recording power of the laser light during recording of information onto the optical disk The inventive computer program is executable by the optical disk recording apparatus to perform the method comprising the steps of activating the laser device to perform test recording while using the monitor device to monitor the recording power of the laser light and while controlling the laser drive voltage, so that the monitored recording power reaches a given reference value during the test recording, measuring the laser drive voltage when the monitored recording power of the laser light reaches the reference value, calculating an initial laser drive voltage based on the reference value of the recording power and the measured laser drive voltage corresponding to the reference value, the initial laser drive voltage corresponding to a target value of the recording power specified for use in recording of information on the optical disk, and setting the calculated initial laser drive voltage to the laser device to start the recording so that an actual recording power of the laser light promptly reaches the target value during the course of the recording.

This computer program can provide the same effect as the inventive construction of the optical disk recording apparatus.

The present invention makes it possible to radiate laser light with two or more different recording powers to a trial write area (OPC area) of an optical disk, find the relational expression between the laser drive voltage and the recording power, and calculate an accurate initial value of the drive voltage in correspondence with a target recording power. This eliminates problems due to turning off the focus servo during the determination of the relational expression, such as causing a deviation between the actual recording power and the target recording power, and requiring unnecessary time before starting the actual recording. For a example, it is possible to fast set the laser power to an accurate target value based on the relational expression for the subsequent OPC operation.

BRIEF DESCRIPTION OF THE DRAWINGS

FIGS. 2(A), 2(B) and 2(C) are block diagrams showing the specific configuration to control the laser power.

DETAILED DESCRIPTION OF THE INVENTION

The present invention can be applied to recordable optical disks in general including: recordable CD optical disks such as CD-R and CD-RW; and recordable DVD optical disks such as DVD-R, DVD+R, DVD-RW, DVD+RW, and DVD-RAM. The following description uses CD-R as an example.

Figure 1:
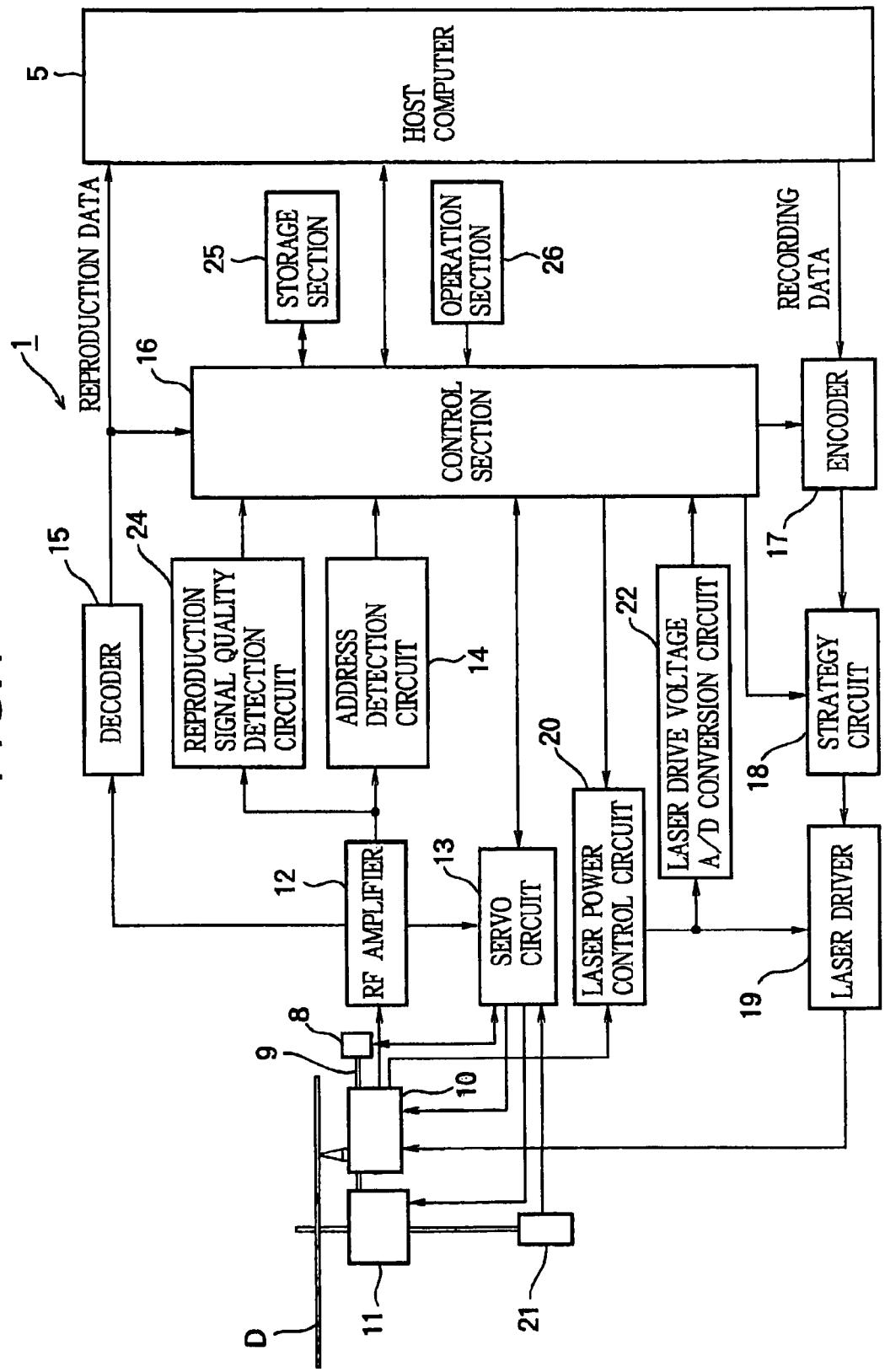
FIG. 1 is a block diagram schematically showing the configuration of an optical disk recording apparatus according to an embodiment of the present invention.

FIG. 1 is a block diagram showing the schematic configuration of an optical disk recording apparatus according to an embodiment of the present invention. As shown in FIG. 1, an optical disk recording apparatus 1 comprises: a thread motor 8, a guide rail 9, an optical pickup 10, a spindle motor 11, an RF amplifier 12, a servo circuit 13, an address detection circuit 14, a decoder 15, a control section 16, an encoder 17, a strategy circuit 18, a laser driver 19, a laser power control circuit 20, a frequency generator 21, a laser drive voltage A/D conversion circuit 22, a reproduction signal quality detection circuit 24, a storage section 25, and an operation section 26. The optical disk recording apparatus 1 is connected to a host computer 5.

The thread motor 8 supplies drive force to move the optical pickup 10 to a radial direction of an optical disk D. The guide rail 9 supports the optical pickup 10 so that the optical pickup 10 moves in the radial direction of the optical disk.

The optical pickup 10 comprises a laser diode 10a (not shown), a front monitor 10b as a power monitor for the laser diode 10a, a photo detector (PD) as a light receiving element for return light (reflected light), an optical system such as a lens and a mirror, and servo mechanisms such as a focus servo and a tracking servo. During data recording and reproduction, the optical pickup 10 radiates the laser light to the optical disk D and receives return light from the optical disk D. The received signal is an RF signal according to EFM (Eight to Fourteen Modulation). The optical pickup 10 outputs the RF signal to the RF amplifier 12. After the laser diode 10a radiates the laser light, a beam splitter (not shown) partially splits the radiated laser light. The front monitor 10b converts the laser light into a voltage corresponding to the laser light power. The voltage is supplied to the laser power control circuit 20.

The spindle motor 11 rotatively drives the optical disk D as a medium to record data. At the tip of a rotating shaft, the spindle motor 11 is provided with an optical disk chucking mechanism comprising a turntable for chucking an optical disk, and the like. The frequency generator 21 outputs a signal for detecting a rotation angle and a rotation speed of the optical disk D to the servo circuit 13.

When the optical pickup 10 outputs the EFM-modulated RF signal, the RF amplifier 12 amplifies this signal and outputs the amplified RF signal to the servo circuit 13, the address detection circuit 14, the reproduction signal quality detection circuit 24, and the decoder 15.

The decoder 15 EFM-demodulates the EFM-modulated RF signal supplied from the RF amplifier 12 to generate reproduction data. The decoder 15 outputs the generated reproduction data to the host computer 5 and the control section 16.

The address detection circuit 14 extracts wobble signal components from the RF signal supplied from the RF amplifier 12. The address detection circuit 14 decodes various information such as time information (address information) included in each signal component and outputs them to the control section 16.

When a test recording area on the optical disk D is reproduced, the reproduction signal quality detection circuit 24 is supplied with the RF signal from the RF amplifier 12. From the RF signal, the reproduction signal quality detection circuit 24 calculates β, a parameter concerning the reproduction signal quality, and outputs a calculation result to the control section 16.

The servo circuit 13 controls rotation of the spindle motor 11, focusing and tracking of the optical pickup 10, and feeding of the optical pickup 10 by the thread motor 8.

The encoder 17 is supplied with recording data output from the host computer and random pattern data output EFM-modulates these data and outputs the modulated data to the strategy circuit 18.

The strategy circuit 18 applies a time axis correction process and the like to the RF signal output from the encoder 17 and outputs the signal to the laser driver 19.

When the control section 16 outputs a write gate signal WG, i.e., during recording, the laser driver 19 drives the laser diode 10a of the optical pickup 10 based on a signal modulated with recorded data supplied from the strategy circuit 18 and a control signal from the laser power control circuit 20.

The laser power control circuit 20 controls the power of laser light radiated from the laser diode 10a of the optical pickup 10. Specifically, the laser power control circuit 20 uses a detection circuit 20a to convert a current value output from the front monitor 10b of the optical pickup 10 into a voltage value. The laser power control circuit 20 controls the laser driver 19 so that the optical pickup 10 radiates the laser light with an optimal laser power. This control operation is based on a voltage value corresponding to the laser light power and a target value (voltage value) of the laser power output from the control section 16.

The laser power control circuit 20 provides the laser driver 19 with an analog value of the laser drive voltage. The laser drive voltage A/D conversion circuit 22 converts this analog value into a digital value and outputs it to the control section 16.

The main control section 16 comprises a CPU, ROM, RAM, and the like (not shown). The control section 16 controls components of the optical disk recording apparatus 1 according to a program stored in the ROM. The program is executed by CPU to operate the recording apparatus. The control section 16 controls the apparatus components so as to perform test recording on a specified area on the optical disk D mounted on the optical disk recording apparatus 1 before final data recording as mentioned above. When providing OPC, the control section 16 outputs an OPC write signal and OPC recording power changeover timing signal to the encoder 17 and the laser power control circuit 20.

The storage section 25 stores data collected during experiments, firmware for the optical disk recording apparatus 1, and the like. The operation section 26 accepts various controls and operations performed by users on the optical disk recording apparatus 1.

Figure 3:
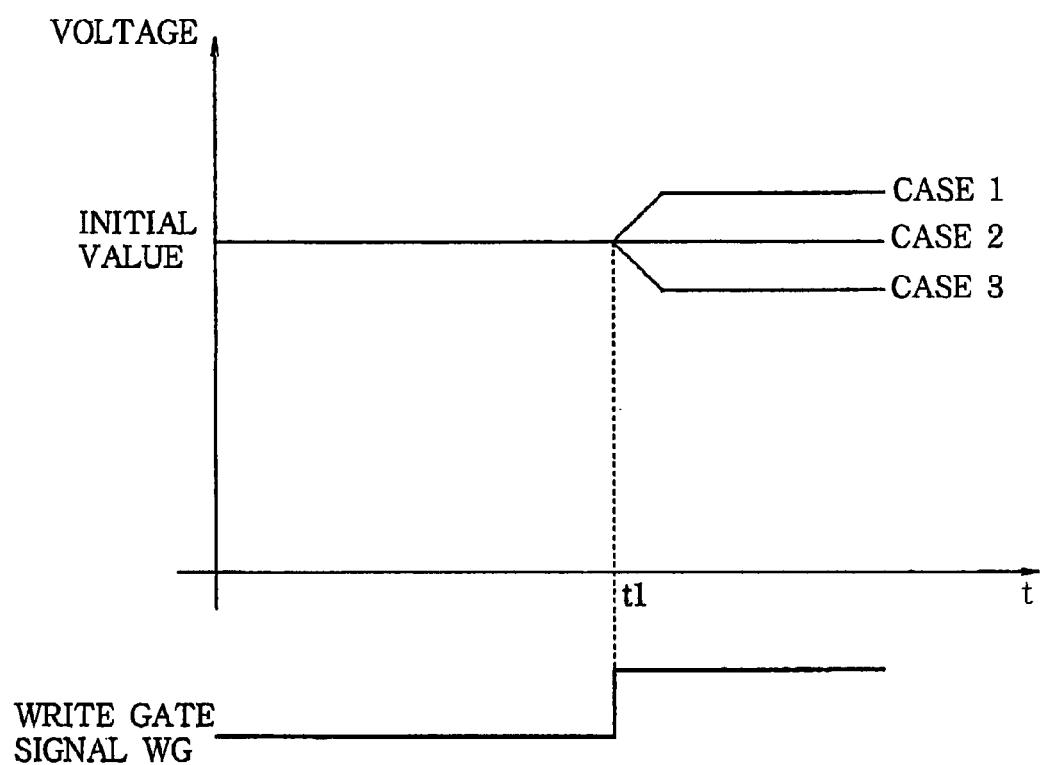
FIG. 3 is a graph showing a variation of laser drive voltage when the recording power is set.

The following describes a specific configuration of the laser power control circuit 20. FIG. 2 is a block diagram showing the specific configuration for laser power control. FIG. 3 is a graph showing laser drive voltage changes when the recording power is set.

As shown in FIG. 2(A), the laser power control circuit 20 comprises a DAC (Digital-to-Analog Converter) 31, a laser power detection circuit 32, a resistor 33, a switch 34, a switch 35, a feedback resistor 36, a capacitor 37, and a differential amplifier 38. As mentioned above, optical pickup 10 comprises the laser diode 10a and the front monitor 10b.

When the control section 16 outputs a digital voltage value, the DAC 31 converts this value into an analog voltage and outputs it to a positive input terminal of the differential amplifier 38. Digital voltage values become target values for the initial laser drive voltage and the recording power. When the laser diode 10a radiates the laser light, the front monitor 10b detects its power and outputs a voltage corresponding to the laser power. The laser power detection circuit 32 performs processes such as stabilizing the voltage output from the front monitor 10b and outputs a voltage corresponding to the voltage value output from the front monitor 10b. The switches 34 and 35 are opened and closed according to a write gate signal output from the control section 16. When the control section 16 does not output the write gate signal WG, the switch 34 is off (opened) and the switch is on (closed). When the control section 16 outputs the write gate signal WG, the switch 34 is on (closed) and the switch 35 is off (opened). The feedback resistor 36 feeds an output terminal voltage of the differential amplifier 38 back to an input terminal of the differential amplifier 38. The capacitor 37 stabilizes output from the differential amplifier 38. The differential amplifier 38 changes the laser drive voltage based on the laser power detected by the front monitor 10b so that the laser power of the laser diode 10a becomes constant in accordance with the voltage value output from the DAC 31.

The following describes operations to calculate an initial laser drive voltage when the optical disk recording apparatus 1 starts recording. In the optical disk recording apparatus 1 according to the present invention, the control section 16 calculates an initial laser drive voltage when the optical disk recording apparatus 1 starts recording. The laser diode 10a radiates the laser light to perform recording at least twice on an OPC area (trial write area) of the optical disk. The control section 16 measures respective laser drive voltages at this time. Based on the measured laser drive voltage and the recording power for recording on the optical disk, the control section 16 calculates a relational expression between the laser drive voltage and the recording power. The relational expression is used to calculate a digital voltage value as an initial laser drive voltage for the target recording power.

The following describes a case where the control section 16 calculates the relational expression by allowing the laser diode 10a to radiate the laser light twice at different recording powers. The present invention is not limited thereto. It may be preferable to perform recording three times or more with different recording powers, measure laser drive voltages respectively, and calculate the relational expression from the laser drive voltages and the recording powers. This method further improves the accuracy of the relational expression between the laser drive voltage and the recording power. Accordingly, it is possible to improve the accuracy of the initial laser drive voltage for the target recording power.

It is a good practice to set two different recording powers for the laser diode 10a as follows. One value is slightly smaller than or equal to the upper bound for the OPC recording on the optical disk. The other value is slightly greater than or equal to the lower bound. This can limit an output range of laser light radiated from the laser diode 10a. Consequently, it is possible to improve not only the accuracy of the relational expression between the laser drive voltage and the recording power, but also the accuracy of the initial laser drive voltage for the target recording power.

The control section 16 does not output the write gate signal WG when no recording is performed on the optical disk. At this time, the switch 34 turns off and the switch 35 turns on. The laser driver 19 stops driving the laser diode 10a. The control section 16 outputs a digital voltage value to the DAC 31. This digital voltage value will become a temporary initial value t_wdac for the laser drive voltage. Therefore, the laser power control circuit 20 has the circuit configuration as shown in FIG. 2(B). That is, the differential amplifier 38 functions as buffer. The control section 16 outputs a digital voltage value as initial laser drive voltage t_wdac to the laser power control circuit 20. The laser power control circuit 20 inputs the temporary initial value to the laser driver 19. The laser driver 19 waits until the write gate signal WG is output. Accordingly, when the write gate signal WG is off as shown in FIG. 3, an output voltage from the differential amplifier 38 becomes equal to initial laser drive voltage t_wdac.

It is not necessary to strictly define temporary initial value t_wdac for the laser drive voltage. The initial value t_wdac may be set to 0. After the write gate signal WG is output, greatly changing the laser drive voltage causes a long time to stabilize the laser light's recording power. For this reason, it is a good practice to specify a temporary laser drive voltage in the DAC 31 so that the laser power can reach the target value in a short time after output of the write gate signal WG. This enables the laser power to reach the target value in a short time in addition to the circuit configuration of the laser power control circuit 20 in FIG. 2(B).

When recording on the optical disk starts, the control section 16 outputs the write gate signal WG. At this time, the switch 34 turns on and the switch 35 turns off. The laser driver 19 starts driving the recording system of the laser diode 10a. The control section 16 further outputs a digital voltage value used as a laser power's target value to the DAC 31. Accordingly, the laser power control circuit 20 has the circuit configuration as shown in FIG. 2(C). That is, the differential amplifier 38 compares the target value (drive voltage value) wdac for the laser power output from the DAC 31 with a voltage value corresponding to the recording power for the laser diode 10a detected by the front monitor 10b. The differential amplifier 38 performs a feedback operation so as to remove a difference between these values. At this time, it generally takes several tens of microseconds after the capacitor 37 is charged until the feedback operation stabilizes. As shown in FIG. 3, when the laser drive voltage has a relatively low temporary initial value, the drive voltage wdac stabilizes at a value higher than the temporary target value t_wdac corresponding to CASE1. When the laser drive voltage has a proper temporary initial value, the drive voltage wdac stabilizes at a value almost same as the temporary target value t_wdac corresponding to CASE2. When the laser drive voltage has a relatively high temporary initial value, the drive voltage wdac stabilizes at a value lower than the temporary target value t_wdac corresponding to CASE3.

Generally, it takes 100 microseconds or shorter after the control section 16 outputs the write gate signal WG until the laser drive voltage stabilizes.

When the laser drive voltage is stabilized to the target power, laser drive voltage A/D conversion circuit 22 measures the laser drive voltage at this time and outputs it to the control section 16. The control section 16 stores this value in the storage section 25.

The optical disk recording apparatus 1 repeats this operation at least twice by changing the target power to different values. Based on each laser drive voltage and each recording power, the control section 16 finds the relational expression between the laser drive voltage and the recording power. When starting the OPC, for example, the control section 16 uses the relational expression to calculate a digital voltage value (recording target value) as an initial laser drive voltage with reference to the target value for the recording power. The control section 16 drives the laser diode 10a corresponding to the laser drive voltage to perform test recording (trial writing) on the OPC area of the optical disk D. The control section 16 finds a voltage to drive the laser diode 10a using the relational expression based on data obtained from recording on the optical disk. The voltage results in a correct value without causing a difference as might occur on conventional apparatuses. The OPC can terminate in a short time without changing values.

Figure 4:
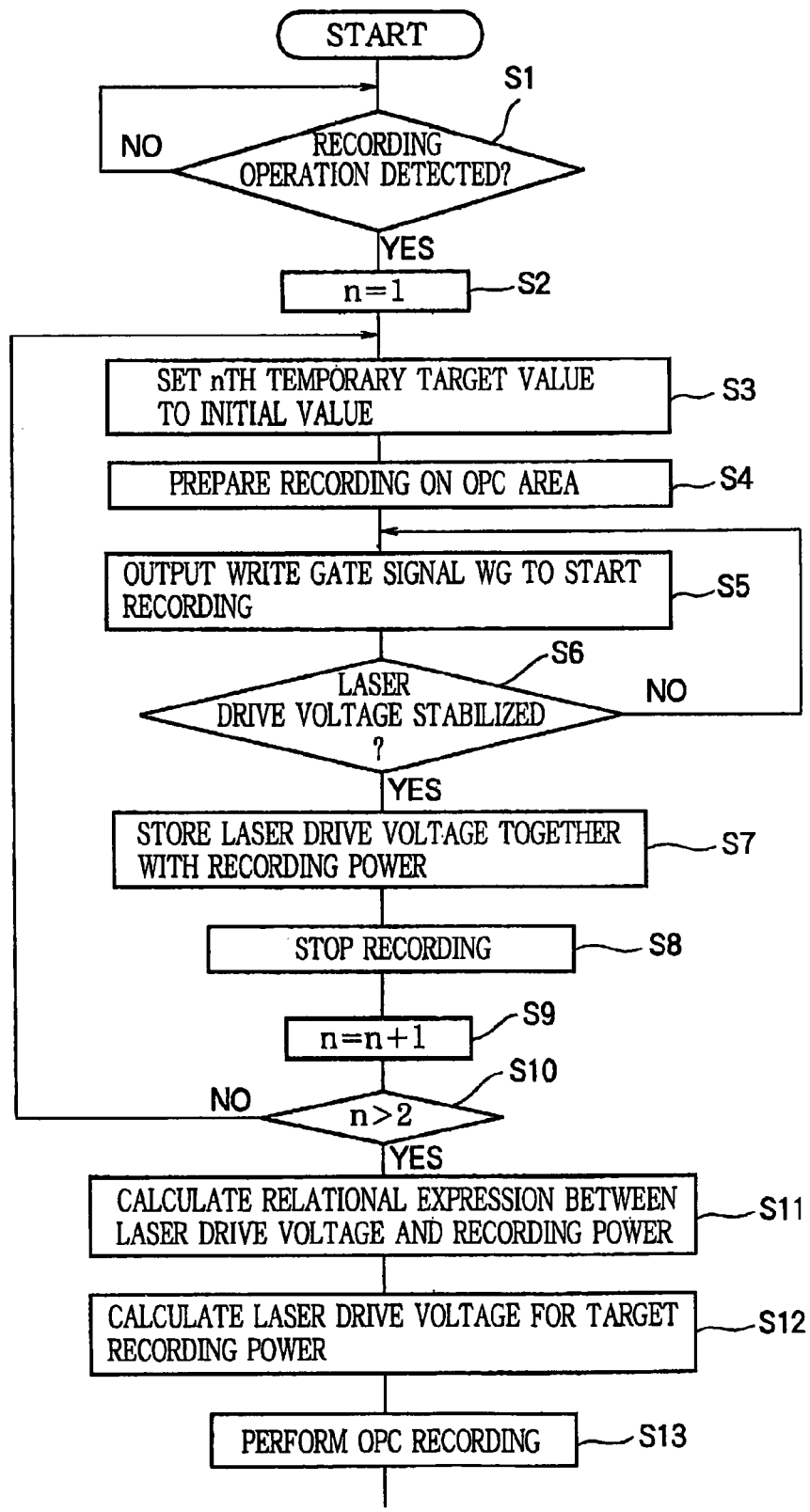
FIG. 4 is a flowchart for describing the method of calculating the initial laser drive voltage for the optical disk recording apparatus.
Figure 5:
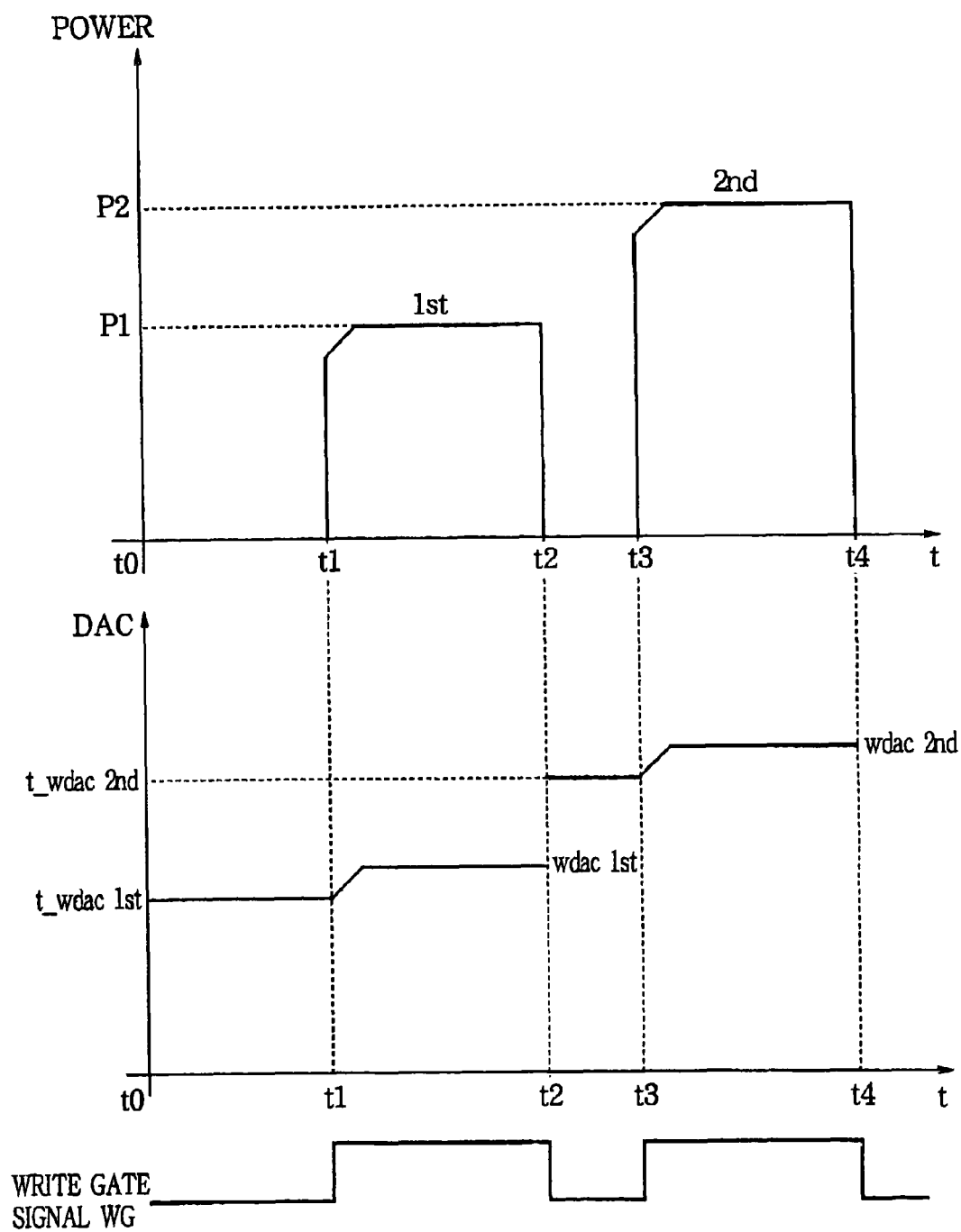
FIG. 5 is a graph showing how values of the laser recording power change during measurement of laser drive voltages.
Figure 6:
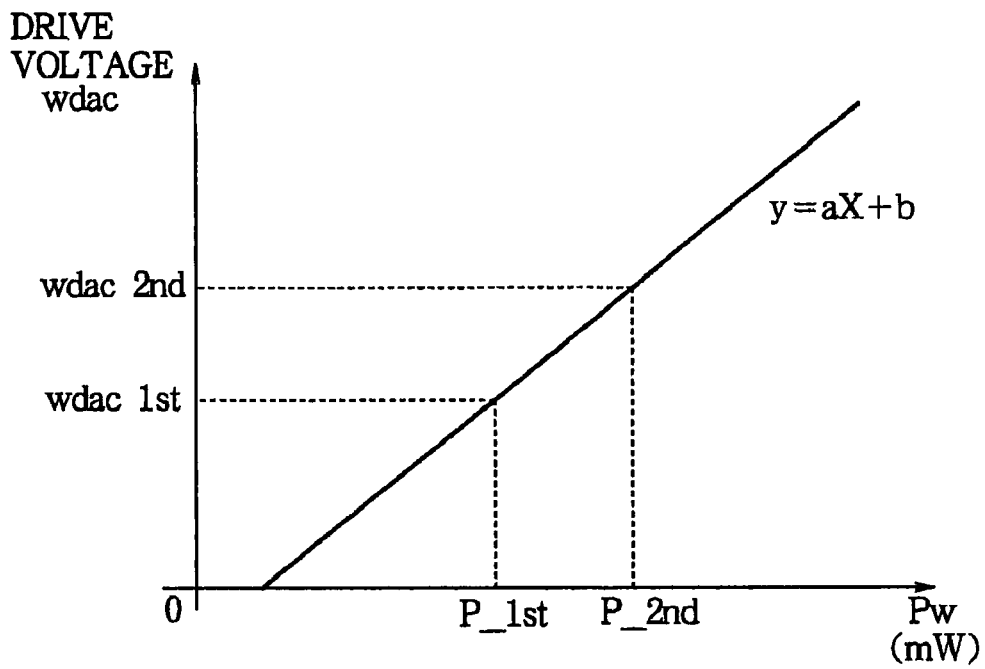
FIG. 6 is a graph showing the relationship between the laser diode recording power and the laser drive voltage.
Figure 7:
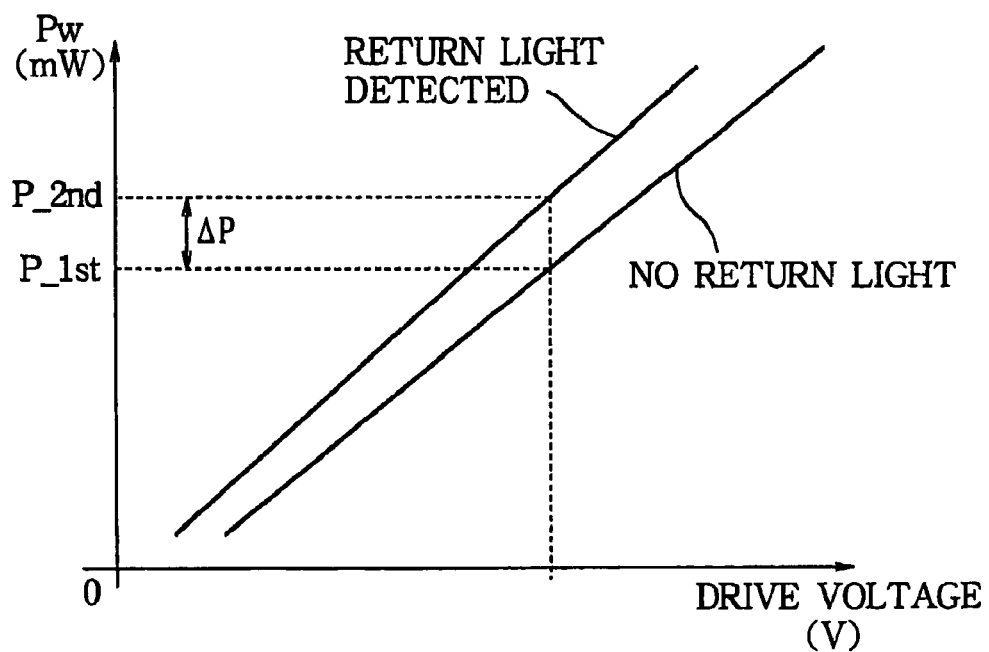
FIG. 7 is a graph showing relationship between a laser diode drive voltage and the recording power.

Referring now to a flowchart, the following describes the method of calculating the initial laser drive voltage for the optical disk recording apparatus 1. FIG. 4 is a flowchart for describing the method of calculating the initial laser drive voltage for the optical disk recording apparatus 1. FIG. 5 is a graph showing how values change during measurement of drive voltages with reference to the laser recording power. FIG. 6 is a graph showing the relationship between the laser diode recording power and the drive voltage finally obtained by the technique of the present invention. FIG. 5 shows a case where the temporary initial value t_wdac nth (n is an integer) is lower than the drive voltage wdacnth. In the following description, the control section 16 of the optical disk recording apparatus 1 measures two different recording powers for the laser diode 10a. That is, one is laser drive voltage wdac1st used for recording on the optical disk D with a recording power P1 slightly larger than the lower bound for recording on the optical disk D. The other is laser drive voltage wdac2nd used for recording on the optical disk D with a recording power P2 slightly smaller than the upper bound. Based on this measurement, the control section 16 finds the relational expression between the laser drive voltage and the recording power. As shown in FIG. 5, the control section 16 outputs the write gate signal WG under the conditions of t1≦t<t2 and t3≦t<t4.

The control section 16 of the optical disk recording apparatus 1 detects that a user uses the operation section 26 to perform an operation to record data on the optical disk D (CD-R) (s1). The control section 16 reads a program (firmware) to calculate an initial laser drive voltage from the storage section 25. Based on this program, the control section 16 performs the process to be described below.

The control section 16 has a counter (not shown) that increments a counter value each time a data acquisition process is performed to calculate the initial laser drive voltage. The counter has an initial value n set to 1. The counter increments the initial value when measuring the target value for the laser drive voltage. The counter value is reset upon completion of the calculation of the initial value for the recording power's target value.

($t0 \leq t < t1$)

When the counter value n is set to 1 (s2), the control section 16 reads a digital voltage value as the first temporary initial value (t_wdac1st) from the storage section 25 and assumes the read value to be the initial laser drive voltage. The control section 16 outputs this value to the DAC 31 of the laser power control circuit 20 (s3). The control section 16 outputs a control signal to the servo circuit 13. The servo circuit 13 starts driving the spindle motor 11 to rotate the optical disk D at a specified speed. The servo circuit 13 also drives the thread motor 8 to move the optical pickup 10 so as to face the OPC area on the optical disk D (s4).

($t1 \leq t < t2$)

The control section 16 outputs a digital voltage value as the first target value to the DAC 31 of the laser power control circuit 20. The control section 16 outputs the write gate signal WG and allows the laser driver 19 to drive the laser diode 10*a*. The laser diode 10*a* radiates the laser light having recording power P1 to the OPC area on the optical disk D. At this time, the control section 16 outputs the control signal to the servo circuit 13 to turn on the focus servo of the optical pickup 10. The control section 16 monitors output from the laser drive voltage AD conversion circuit 22. When the laser drive voltage stabilizes (s6), the control section 16 assumes the laser drive voltage at this time to be a digital voltage value that becomes the first initial value wdac1st for the laser drive voltage. The control section 16 associates this value with the recording power P1 and stores it in the storage section 25 (s7).

The control section 16 stops the write gate signal WG to stop recording on the OPC area of the optical disk D (s8). The control section 16 increments the value of the counter (not shown) by one to set n to 2 (s9). The control section 16 then determines whether or not n is greater than 2 (s10).

($t2 \leq t < t3$)

The control section 16 of the optical disk recording apparatus 1 performs the process from steps s3 through s10 to obtain the second initial value wdac2nd for the laser drive voltage. That is, the control section 16 reads a digital voltage value as the second temporary initial value (t_wdac2nd) from the storage section 25. The control section 16 outputs the read value as an initial laser drive voltage to the DAC 31 of the laser power control circuit 20 (s3). The control section 16 then outputs a control signal to the servo circuit 13. The servo circuit 13 starts driving the spindle motor 11 to rotate the optical disk D at a specified speed. The servo circuit 13 also drives the thread motor 8 to move the optical pickup 10 so as to face the end of the already recorded portion of the OPC area on the optical disk D (s4).

($t3 \leq t < t4$)

The control section 16 outputs a digital voltage value as the second target value to the DAC 31 of the laser power control circuit 20. The control section 16 also outputs the write gate signal WG and allows the laser driver 19 to drive the laser diode 10*a*. The laser diode 10*a* radiates the laser light having recording power P2 to start recording from the end of the already recorded portion in the OPC area. At this time, the control section 16 outputs a control signal to the servo circuit 13 to turn on the focus servo of the optical pickup 10 (s5). The control section 16 monitors output from the laser drive voltage AD conversion circuit 22. When the laser drive voltage stabilizes (s6), the control section 16 assumes the laser drive voltage at this time to be a digital voltage value that becomes the second initial value wdac2nd for the laser drive voltage. The control section 16 associates this value with the recording power P2 and stores it in the storage section 25 (s7).

The control section 16 stops the write gate signal WG to stop recording on the OPC area of the optical disk D (s8). The control section 16 increments the value of the counter (not shown) by one to set n to 3 (s9). The control section 16 then determines whether or not n is greater than 2 (s10).

($t4 \leq t$)

In case of n>2, the control section 16 reads values of the laser drive voltages wdac1st and wdac2nd and laser recording powers P1 and P2 stored in the storage section 25. The control section 16 calculates the relational expression between the laser drive voltage and the recording power (s11). This relational expression can be represented as a linear function (y=ax+b) as shown in FIG. 6, for example.

When obtaining the relational expression, the control section 16 reads, from the storage section 25, a value for the target recording power for the OPC recording (trial writing) to be performed next. Based on the relational expression between the laser drive voltage and the laser recording power, the control section 16 calculates an initial laser drive voltage (recording target value) for radiating the laser light having the target recording power. The control section 16 outputs the write gate signal WG and outputs the initial laser drive voltage calculated at step s12 to the DAC 31 of the laser power control circuit 20 to start the OPC recording (s13).

As described above, the inventive optical disk recording apparatus has an optical pickup 10 containing a laser device such as a laser diode 10*a* driven by a laser drive voltage wdac for radiating a laser light having a recording power P for performing recording of information onto an optical disk D. In the apparatus, a monitor section in the form of the front monitor 10*b* monitors the recording power P of the laser light. A laser control section in the form of laser power control circuit 20 enables the laser device 10*a* to perform test recording while using the monitor section 10*b* to monitor the recording power P of the laser light and while controlling the laser drive voltage wdac, so that the monitored recording power P reaches a given reference value during the test recording. A voltage measurement section including the laser drive voltage A/D conversion circuit 22 measures the laser drive voltage wdac when the recording power P of the laser light reaches the reference value. A calculation section calculates an initial laser drive voltage from the reference value of the recording power P and the measured laser drive voltage wdac corresponding to the reference value. The initial laser drive voltage corresponding to a target value of the recording power specified for use in recording of information on the optical disk D. A main control section 16 allows the laser control section 20 to set the calculated initial laser drive voltage and to start the recording while supplying the laser control section 20 with the target value so that an actual recording power of the laser light promptly reaches the target value during the course of the recording.

Practically, the inventive optical disk recording apparatus further comprises a storage section 25 that stores at least two reference values wdac 1st and wdac 2nd of the recording power. The voltage measurement section 22 measures laser drive voltages P__1st and P__2nd matching the respective reference values wdac 1st and wdac 2nd stored in the storage section 25, and the calculation section formulates a relational expression y=ax+b shown in FIG. 6 between the laser drive voltage wdac and the recording power P of the laser light based on the respective reference values wdac 1st and wdac 2nd and the measured laser drive voltages P__1st and P__2nd corresponding to the respective reference values wdac 1st and wdac 2nd, and uses this relational expression Y=aX+b to calculate the initial laser drive voltage Y corresponding to the target value X of the recording power. Namely, the calculation section substitutes the target value X of the recording power for the relational expression Y=aX+b to calculate the initial laser drive voltage Y. Practically, the calculation section calculates the initial laser drive voltage for use in optical power control (OPC) operation.

As mentioned above, the optical disk recording apparatus 1 uses the initial laser drive voltage calculated based on the relational expression between the laser drive voltage and the laser recording power. Accordingly, the optical disk recording apparatus 1 can perform recording using proper recording power immediately after output of the write gate signal WG when the recording starts for the first time. Recently, there may be a case of not feeding back the laser drive voltage during OPC recording. Even in such case, the method of calculating the laser drive voltage initial value according to the present invention can be used to find a drive voltage having a specified laser power. This enables recording with precisely the same recording power as intended if the recording takes place in a short time period.

While there has been described the case where recording is performed on the OPC area to find the relational expression between the laser drive voltage and the laser recording power, the present invention is not limited thereto. Recording may be performed on a recording area of the optical disk D. When the amount of data is smaller than the optical disk's recording capacity, for example, no data is recorded to leave an unused area near the outermost periphery of the recording area. It is a good practice to use the vicinity of the outermost periphery of the recording area to perform data recording before the OPC recording. When data is recorded on rewritable optical disks such as CD-RW and DVD-RW, data can be overwritten to an area where data is already recorded. In such case, data may be recorded on an inner periphery of the data recording area.

What is claimed is:

1. An optical disk recording apparatus having an optical pickup containing a laser device driven by a laser drive voltage for radiating a laser light having a recording power for performing recording of information onto an optical disk, the optical pickup including a focus servo, the apparatus comprising:
    a monitor section that monitors the recording power of the laser light and that has a photo detector which receives laser light reflected from the optical disk when the focus servo is enabled;
    a laser control section that enables the laser device to perform recording while using the monitor section to monitor the recording power of the laser light and while controlling the laser drive voltage, so that the monitored recording power reaches a reference value optical disk prior to starting optical power control (OPC), with the focus servo of the optical pickup enabled so that the laser light reflected from the optical disk partially returns to the laser device and thus the recording power of the laser light emitted from the laser device is affected by the returning laser light;
    a voltage measurement section that measures the laser drive voltage when the recording power of the laser light reaches the reference value;
    a calculation section that calculates, when starting the optical power control (OPC) operation before performing actual recording of information, an initial laser drive voltage from the reference value of the recording power and the measured laser drive voltage corresponding to the reference value, the initial laser drive voltage corresponding to a target value of the recording power specified for use in recording of information on an OPC area of the optical disk during the optical power control (OPC) operation; and
    a main control section that allows the laser control section to set the calculated initial laser drive voltage and to start the recording of information on the OPC area while supplying the laser control section with the target value so that an actual recording power of the laser light promptly reaches the target value during the course of the recording of information on the OPC area.

2. The optical disk recording apparatus according to claim 1, further comprising a storage section that stores at least two reference values of the recording power, wherein the voltage measurement section measures laser drive voltages matching the respective reference values stored in the storage section, and the calculation section formulates a relational expression between the laser drive voltage and the recording power of the laser light based on the respective reference values and the measured laser drive voltages corresponding to the respective reference values and uses this relational expression to calculate the initial laser drive voltage corresponding to the target value of the recording power.

3. The optical disk recording apparatus according to claim 2, wherein the calculation section substitutes the target value of the recording power for the relational expression to calculate the initial laser drive voltage.

4. A computer implemented method for use in an optical disk recording apparatus having an optical pickup containing a laser device driven by a laser drive voltage for radiating a laser light having a recording power onto an optical pickup, and a monitor device for monitoring the recording power of the laser light, the optical pick up including a focus servo and the monitor device receiving laser light reflected from the optical disk when the focus servo is enabled the method comprising:
    activating the laser device to perform recording while using the monitor device to monitor the recording power of the laser light and while controlling the laser drive voltage, so that the monitored recording power reaches a reference value prior to starting optical power control (OPC), with the focus servo of the optical pickup enabled so that the laser light reflected from the optical disk partially returns to the laser device and thus the recording power of the laser light emitted from the laser is affected by the returning laser light;
    measuring the laser drive voltage when the monitored recording power of the laser light reaches the reference value;
    calculating, when starting the optical power control (OPC) operation before performing actual recording of information, an initial laser drive voltage based on the reference value of the recording power and the measured laser drive voltage corresponding to the reference value, the initial laser drive voltage corresponding to a target value of the recording power specified for use in recording of information on an OPC area of the optical disk during the optical power control (OPC) operation; and
    setting the calculated initial laser drive voltage to the laser device to start the recording of information on the OPC area so that an actual recording power of the laser light promptly reaches the target value during the course of the recording of information on the OPC area.

5. An optical disk recording apparatus having an optical pickup containing a laser device driven by a laser drive voltage for radiating a laser light having a recording power for performing recording of information onto an optical disk, the optical pickup including a focus servo, the apparatus comprising:

monitor means for monitoring the recording power of the laser light, the monitor means having a photo detector which receives laser light reflected from the optical disk when the focus servo is enabled;

laser control means for enabling the laser device to perform recording while using the monitor means to monitor the recording power of the laser light and while controlling the laser drive voltage, so that the monitored recording power reaches a reference value prior to starting optical power control (OPC), with the focus servo of the optical pickup enabled so that the laser light reflected from the optical disk partially returns to the laser device and thus the recording power of the laser light emitted from the laser device is affected by the returning laser light;

voltage measurement means for measuring the laser drive voltage when the recording power of the laser light reaches the reference value;

calculation means for calculating, when starting the optical power control (OPC) operation before performing actual recording of information, an initial laser drive voltage from the reference value of the recording power and the measured laser drive voltage corresponding to the reference value, the initial laser drive voltage corresponding to a target value of the recording power specified for use in recording of information on an OPC area of the optical disk during the optical power control (OPC) operation; and main control means for allowing the laser control means to set the calculated initial laser drive voltage and to start the recording of information on the OPC area while supplying the laser control means with the target value so that an actual recording power of the laser light promptly reaches the target value during the course of the recording of information on the OPC area.

6. A method of operating an optical disk recording apparatus having an optical pickup containing a laser device driven by a laser drive voltage for radiating a laser light having a recording power onto an optical pickup, and a monitor device for monitoring the recording power of the laser light, the optical pick up including a focus servo and the monitor device receiving laser light reflected from the optical disk when the focus servo is enabled the method comprising the steps of:

activating the laser device to perform recording while using the monitor device to monitor the recording power of the laser light and while controlling the laser drive voltage, so that the monitored recording power reaches a reference value prior to starting optical power control, with the focus servo of the optical pickup enabled so that the laser light reflected from the optical disk partially returns to the laser device and thus the recording power of the laser light emitted from the laser is affected by the returning laser light;

measuring the laser drive voltage when the monitored recording power of the laser light reaches the reference value;

calculating, when starting the optical power control (OPC) operation before performing actual recording of information, an initial laser drive voltage based on the reference value of the recording power and the measured laser drive voltage corresponding to the reference value, the initial laser drive voltage corresponding to a target value of the recording power specified for use in recording of information on an OPC area of the optical disk during the optical power control (OPC) operation; and setting the calculated initial laser drive voltage to the laser device to start the recording of information on the OPC area so that an actual recording power of the laser light promptly reaches the target value during the course of the recording of information on the OPC area.

7. An optical disk recording apparatus having an optical pickup containing a laser device driven by a laser drive voltage for radiating a laser light having a recording power for performing recording of information onto an optical disk, the apparatus comprising:

a focus servo section that performs a focus servo of the optical pickup;

a monitor section that monitors the recording power of the laser light and that has a photo detector which receives laser light reflected from the optical disk when the focus servo is enabled;

a storage section that stores at least two reference values of the recording power;

a laser control section that enables the laser device to perform recording while using the monitor section to monitor the recording power of the laser light and while controlling the laser drive voltage, so that the monitored recording power reaches the respective values prior to starting optical power control (OPC), with the focus servo section enabled so that the laser light reflected from the optical disk partially returns to the laser device and thus the recording power of the laser light emitted from the laser device is affected by the returning laser light;

a voltage measurement section that measures the laser drive voltage when the recording power of the laser light reaches each of the reference values;

a calculation section that formulates a relational expression between the laser drive voltage and the recording power of the laser light when starting the optical power control (OPC) operation before performing actual recording of information based on the respective reference values and the measured laser drive voltages corresponding to the respective reference values, and that uses this relational expression to calculate an initial laser drive voltage corresponding to a target value of the recording power specified for use in recording of information on an OPC area of the optical disk during the optical power control (OPC operation); and a main control section that allows the laser control section to set the calculated initial laser drive voltage and to start the recording of information on the OPC area for the optical power control operation while supplying the laser control section with the target value so that an actual recording power of the laser light promptly reaches the target value during the course of the recording of information on the OPC area for the optical power control operation.

8. The optical disk recording apparatus according to claim 7, wherein the storage section stores one reference value of the recording power smaller than or equal to an upper bound defined for the optical power control operation, and another reference value greater than or equal to a lower bound defined for the optical power control operation.

* * * * *